Dec. 27, 1966 W. G. BROWN 3,295,065

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 1

INVENTOR.
WARREN G. BROWN
BY Alfred C. Hill
AGENT

Dec. 27, 1966 W. G. BROWN 3,295,065

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 2

INVENTOR
WARREN G. BROWN
BY Alfred C. Hill
AGENT

Dec. 27, 1966 W. G. BROWN 3,295,065

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 3

INVENTOR.
WARREN G. BROWN
BY Alfred C. Hill
AGENT

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 4

INVENTOR.
WARREN G. BROWN
BY Alfred C. Hill
AGENT

Dec. 27, 1966 W. G. BROWN 3,295,065

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 5

INVENTOR.
WARREN G. BROWN

BY Alfred C. Hill

AGENT

Dec. 27, 1966 W. G. BROWN 3,295,065

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 6

INVENTOR.
WARREN G. BROWN
BY Alfred C. Hill
AGENT

Dec. 27, 1966 W. G. BROWN 3,295,065

PULSE GENERATOR EMPLOYING CASCADED COUNTERS AND COINCIDENCE CIRCUITRY FOR PRODUCING PLURAL FREQUENCY OUTPUTS

Filed March 17, 1964 7 Sheets-Sheet 7

INVENTOR.
WARREN G. BROWN
BY Alfred C. Hill
AGENT

United States Patent Office 3,295,065
Patented Dec. 27, 1966

3,295,065

PULSE GENERATOR EMPLOYING CASCADED COUNTERS AND COINCIDENCE CIRCUITRY FOR PRODUCING PLURAL FREQUENCY OUTPUTS

Warren G. Brown, River Vale, N.J., assignor to International Telephone and Telegraph Corporation, Nutley, N.J., a corporation of Maryland Filed Mar. 17, 1964, Ser. No. 352,523
20 Claims. (Cl. 328—62)

This invention relates to pulse generators and more particularly to gate pulse generators to provide within a predetermined period a plurality of groups of pulse trains, each of the groups of pulse trains having a different repetition rate for employment in a time division multiplex system simultaneously handling several classes of service with each class of service having a different repetition rate corresponding to the different repetition rates of the groups of pulse trains.

As employed in the present application, the different classes of services are identified as class A, class B, and class C. Class A service is a Teletype service having a rate in the range of 50 to 100 bits per second, class B service is a medium speed data service for card or tape readers having a rate of 1200 to 2400 bits per second, and class C designates a high speed data or PCM (pulse code modulation) service for digital coded voice signals having 40,000 or more bits per second as its service rate. For purposes of the explanation and description contained herein it will be assumed that the master clock has a rate of 1.4 mc., class A service operates at 75 bits per second, class B service operates at a rate of 2400 bits per second, and class C service has a rate of 57.6 kc. bits per second for PCM or delta modulation with a framing pulse every 17.36 microseconds and 24 0.692 microsecond baud intervals for individual channels. Employing these assumed figures, a single frame of multiplexed pulse trains will provide a group of 32 Teletype (class A) channels each operating at 75 bits per second in a single 2400 bit per second or one data (class B) channel. A group of 24 class (B) (or 23 class B and 32 class A channels) uses 57,600 bits per second or one class C, delta or PCM, channel. Twenty-four class C channels (or 23 class C plus 23 class B plus 32 class A channels), and a timing pulse uses the 1,440,000 bits per second mentioned in the basic assumed rate. This proposed capacity can be divided into other ratios and, while the above ratios seem to offer a good proportioning of service for local areas, it is felt that the trunk should be utilized with only 22 class C channels to double the class A and class B capacities. In such a system it will be necessary to provide at both the transmitter and receiver generators to provide gate pulses appropriately timed for the various channels of the various classes of services to properly separate the services, the channels within the services, and to provide the channel pulses for modulation at the transmitter end and to demodulate the channel pulses at the receiver end.

In the past, the solution to the problem of generating the gate pulses has been approached from the standard delay line distributor arrangement to provide the higher speed service and to utilize one of the channel pulses to trigger a reflecting delay line divider circuit or other divider arrangements to produce the desired lower class of service. It will be immediately recognized, however, that in a delay line divider utilizing a multiple reflection in the delay line to bring about the division, even with ten trips on such a delay line that the delay line will be relatively long and bulky to divide from the 57.6 kc. rate of class C operation to the 2400 c.p.s. of class B operation. Of course, the same bulk and length of delay line to a greater magnitude will be present to divide from 2400 c.p.s. to 75 c.p.s. for class A operation.

Therefore, an object of this invention is the provision of a generator to provide gate pulses for the interleaved classes of services employing a reduced amount of equipment and providing a reduction in the complexity and bulk of the equipment to provide the necessary gate pulses for the interleaved classes of service arrangement for producing gate pulses operable with a communication system having a plurality of interleaved multi-speed services which will permit the sharing of radio systems, cable system repeaters, and large portions of channel drop facilities and switching facilities in the communication system.

Still another object of this invention is the provision of a generator to provide gate pulses for multi-speed service communication system employing modular construction wherein one circuit, such as a divider circuit, can be employed for each of the divider circuits in the generator itself, thereby representing a reduction in the necessary number of spare parts required for servicing the communication system.

A feature of this invention is the provision of an arrangement to derive from a single clock source two pulse trains of different repetition rates and to beat these two pulse trains together to produce a third pulse train having the desired repetition rate for producing the gate pulses of a lower speed service.

Another feature of this invention is the provision of an arrangement deriving from the gate pulses of each of the service rates a master synchronzing signal capable of being recognized at the receiving end of the communication system to facilitate the establishment of synchronization between the transmitting end and the receiving end of the communication system.

Still another feature of this invention is to provide a single clock source from which are derived timing pulses to control the modulation or demodulation of channels of a plurality of different services each having a different repetition rate with a minimum of delay in deriving the gate pulses for the lower repetition rates from the higher repetition rates.

A further feature of this invention is the provision of a plurality of groups of pulse trains each of different repetition rate wherein one or more of the higher speed channel gate pulses may be employed as the clock pulse for producing the plurality of lower speed channel gate pulses with one or more of the lower speed channel gate pulses being utilized as the clock pulse for still a lower speed communication apparatus, thereby permitting a variation in the capacity of the communication system for the lower speed services.

Still a further feature of this invention is the provision of a generator to provide within a predetermined period a plurality of groups of pulse trains, each of the groups of pulse trains having a different repetition rate comprising a source of pulses having a given repetition rate, a first means coupled to the source to produce a first group of pulse trains having a first repetition rate equal to a first integral fraction of said given repetition rate, second means coupled to one of the sources and the first means to produce pulses having a second repetition rate equal to a second integral fraction of the given repetition rate different than the first integral fraction, and third means coupled to the first means and the second means to produce at least a second group of pulse trains having a third repetition rate equal to a third integral fraction of the given repetition rate different than the second integral fraction.

The above-mentioned and other features and objects of this invention will become more apparent by reference to the following description taken in conjunction with the accompanying drawings, in which:

FIG. 1 is a diagram illustrating the beat method of generating timing pulses in accordance with the principles of this invention;

FIGS. 2, 3, and 4 are schematic diagrams in block form of variations of the pulse generator of FIG. 1 utilizing the best method in accordance with the principles of this invention;

Figure 1:
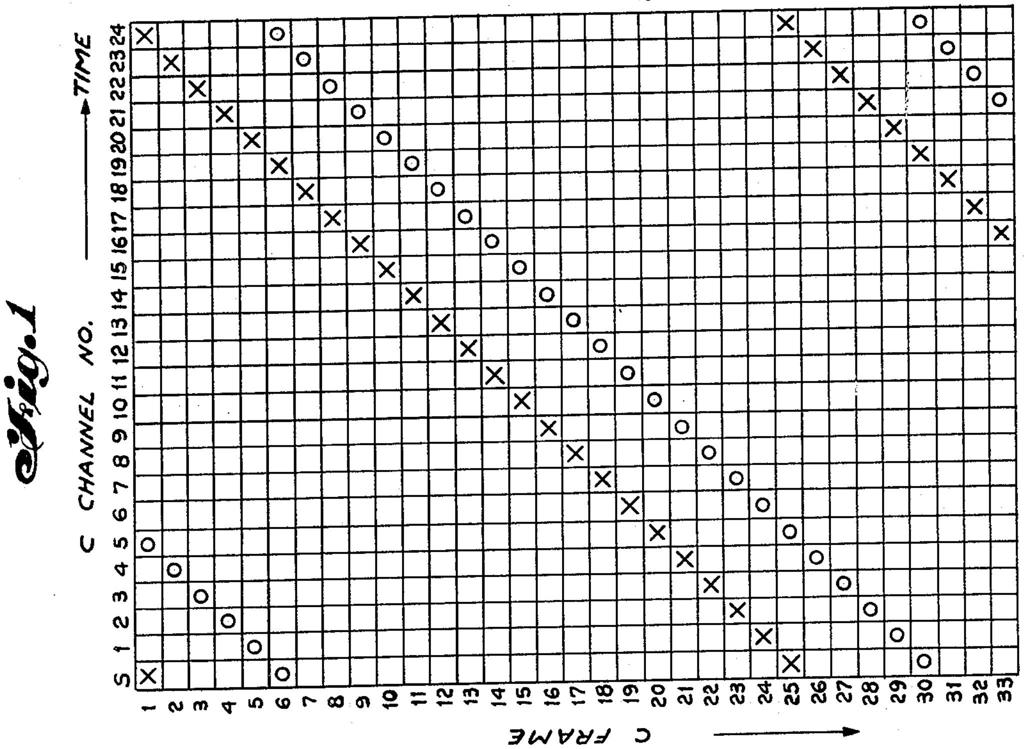

The pulse generator of this invention is based upon the ability of beating two pulse trains of different repetition frequency together in a coincidence device to produce a third pulse train having a third repetition rate of lower value than either of the first two repetition rates. For instance, in the example employed herein, 57.6 kc. pulses are derived from the master clock and there is then provided a second pulse train of 60 kc. pulses with these two pulse trains being beaten together to obtain a pulse train having a repetition rate of 2400 pulses per second in any of the 24 relative positions or phases of the 57.6 kc. pulse train. This is rather difficult to show on a linear timing diagram, but by cutting the diagram into strips and placing each strip below the previous strip a raster presentation, such as illustrated in FIG. 1, is obtained. The 25 squares across the top from left to right represent the class C framing or synchronizing pulse S and then the 24 channels in sequence. The next class C frame is represented by the second row with each channel in the same column as in the previous frame. Each of the succeeding frames is then positioned below one another to form the raster of FIG. 1. If a 24:1 divider is started on the first class C framing pulse S, this divider will fire again on the 24th channel of the first frame, the 23rd channel of the next frame, and so forth, firing in each square marked with an X. Twenty-four frames later the divider will again fire on framing time and the resultant output of the 24:1 divider will have the rate of 2400 cycles per second (c.p.s.). If an "AND" gate is now fed with the framing pulse, the divider output will produce 2400 c.p.s. output pulses per second in the framing or synchronizing pulse time slot. It is obvious, of course, that the divider output can be "AND" gated with any other of the class C pulses and will produce a 2400 c.p.s. output in the time slot of that particular pulse.

Further referring to FIG. 1, it can be demonstrated that if the 24:1 divider is started, five class C bauds later, it can be made to beat with the framing gate pulse five frames later, as illustrated by the circles in FIG. 1 at 24 baud intervals.

Figure 2:
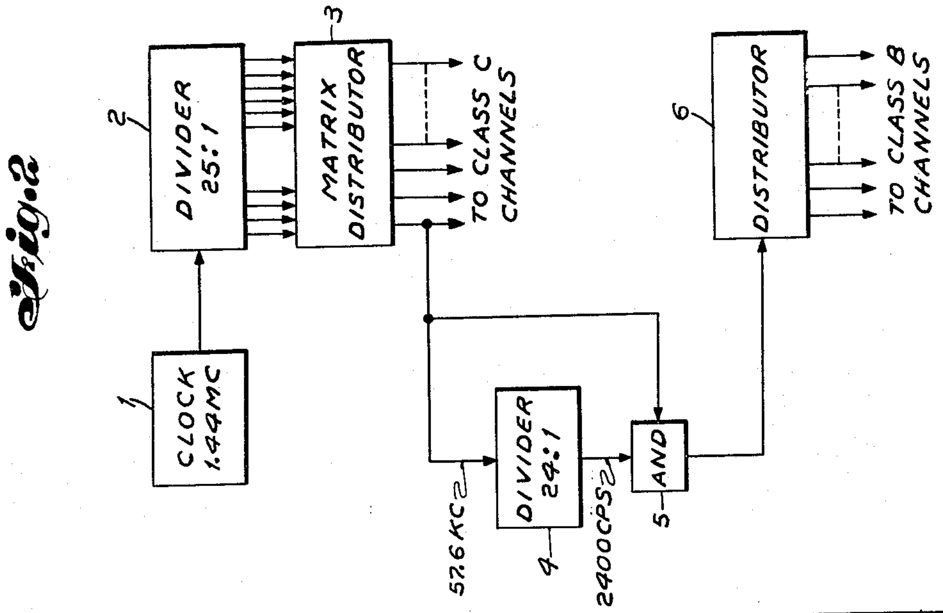

Referring to FIG. 2, there is illustrated therein the components to carry out the operation represented by and described in connection with the X's of FIG. 1. A clock 1 having a repetition rate of 1.44 mc. is coupled to a 25:1 divider 2 which may be provided by flip-flop logic circuitry with a matrix type distributor 3 providing the 24 channel gate pulses for class C operation having a repetition rate of 57.6 kc. The framing gate pulse of distributor 3 is coupled to a 24:1 divider 4 which operates to produce at its output 2400 cycles per second pulses. This output is then coupled to an "AND" gate 5 which is gated by the framing gate pulse to provide at the output thereof 2400 c.p.s. pulses in the time slot of the framing channel to act as a clock pulse for distributor 6 to provide the 24 channels for class B service, each channel gate pulse having a repetition rate of 2400 c.p.s.

Figure 3:
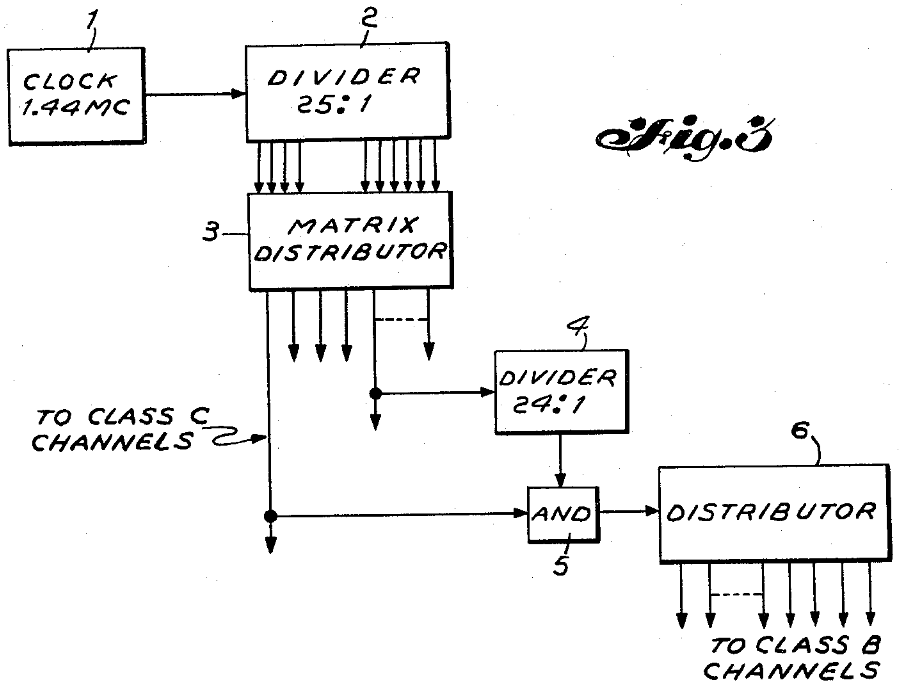

Referring to FIG. 3, the components of FIG. 2 are illustrated to provide the timing pulse output as described in connection with the 0's of FIG. 1. The components in operation of FIG. 3 are substantially the same as that of FIG. 2 only that there is a slight delay before the 2400 c.p.s. pulses are synchronized with the timing of the framing channel gate pulse.

Figure 4:
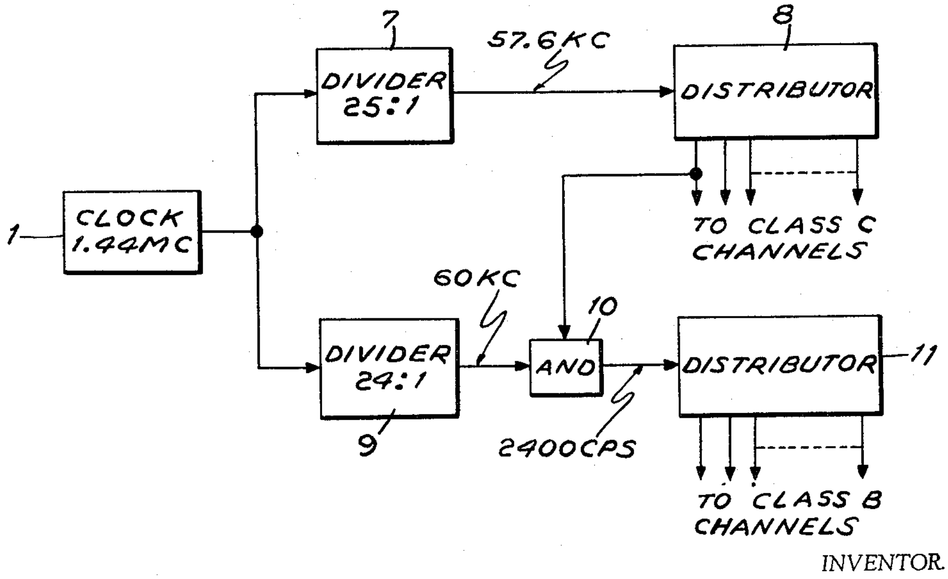

Referring to FIG. 4, there is illustrated therein still another arrangement which may be utilized in the beat method of providing a clock pulse of lower repetition rate than the master clock repetition rate. Clock 1 supplies its signals to a 25:1 divider 7 which provides at the output thereof 57.6 kc. repetition pulse signals. This output of divider 7 is coupled to a distributor 8, such as a delay line, to provide the 24 class C channel pulses and the framing channel pulse. The output of clock 1 is also coupled to a 24:1 divider 9 which provides at the output thereof a pulse train having a repetition rate of 60 kc. cycles. The output of divider 9 and the gate pulse occurring in synchronizing or framing time at the output of distributor 8 are both coupled to an "AND" circuit 10 which produces at the output thereof a pulse train having a repetition rate of 2400 c.p.s. synchronized with the framing time of the class C channels. The output of "AND" circuit 10 is coupled to distributor 11 to provide the class B channel gate pulses.

The beat method described hereinabove can be utilized to generate class B output pulses providing that suitable rates are chosen. The beat method can be used in general when the number of C frame time divisions has no common factor with the number of beat channels. The 25 to 24 ratio is a very satisfactory ratio but it is not unique since other ratios which will meet this provision of having no common factor are available.

Figure 5:
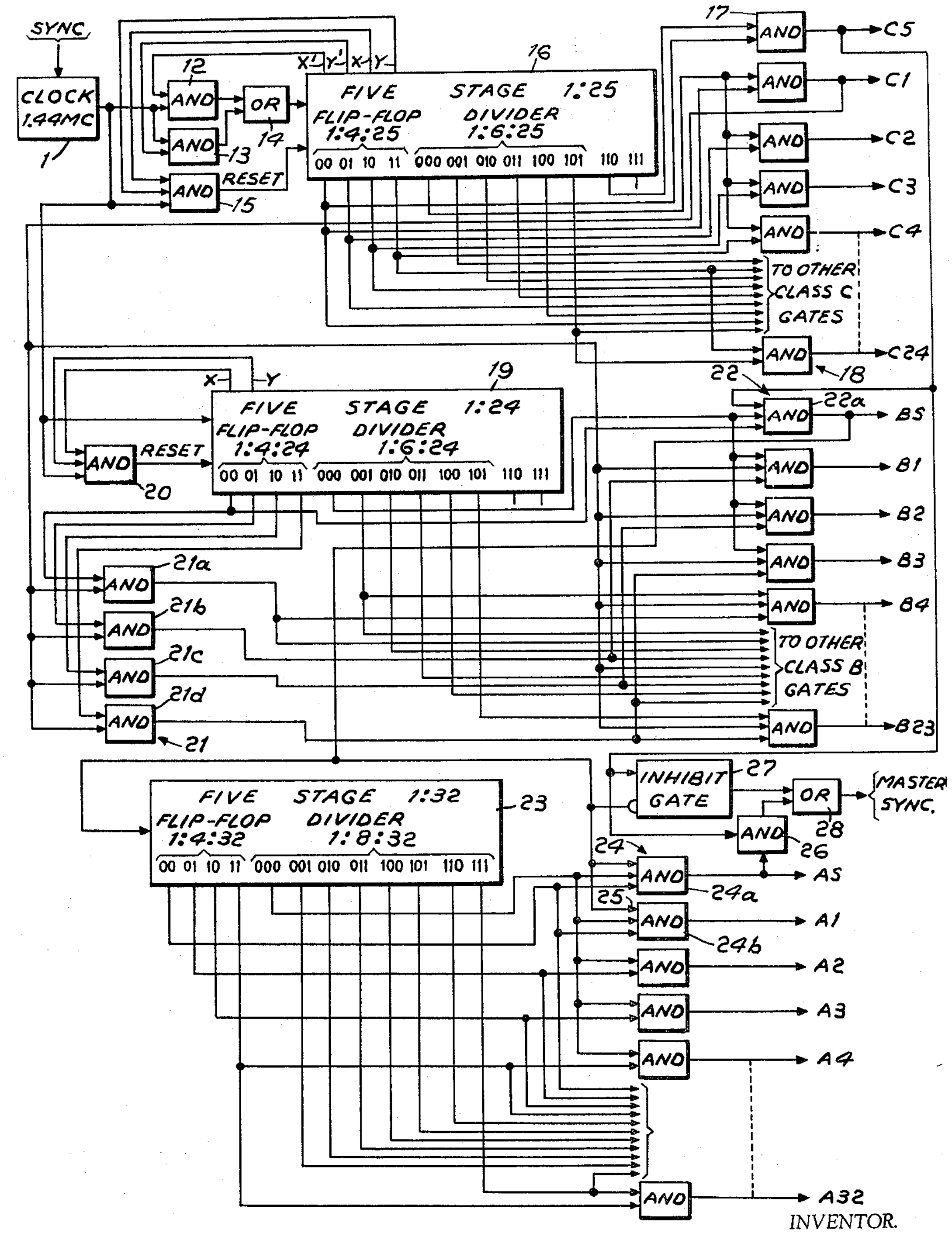
FIG. 5 is a schematic diagram in block form of a pulse generator providing three gate or timing pulse trains or groups for three classes of service in accordance with the principles of this invention.

Referring to FIG. 5, there is illustrated therein a pulse generator following the principles of the arrangement of FIG. 4 to generate the required channel pulses for a communication system employing an intermixture of different classes of services, each service operating at a different repetition rate. Clock 1 is the basic timing standard for the pulse generator and can be a crystal controlled oscillator. If this pulse generator is employed in relation with the receiving equipment of the communication system, it may be desirable to synchronize this clock 1 to the clock of the transmitting portion of the communication system which can be accomplished by deriving the synchronizing signal from the received pulse train and applying this synchronizing signal to the oscillator.

The output of clock 1 is fed to input gates, "AND" gates 12 and 13, and "OR" gate 14 and a reset gate 15 cooperating with a five-stage flip-flop divider 16 which will be described hereinbelow in connection with FIG. 6. Divider 16 defines class C channel gate pulses. Divider 16 is controlled by the input gates 12, 13, and 14 in a manner to allow all clock pulses but the 25th clock pulse to be counted and the reset gate 15 is enabled after the 24th count to reset divider to 00000 for channel 1. The X, X′, Y and Y′ outputs are a function of the count and are used to control gates 12, 13, and 15. The 1:4:25 and 1:6:25 outputs of divider 16 are used to define channel times and produce a gate pulse in accordance with these channel times. No combination of these outputs will define synchronizing times since synchronization or framing time is actually channel 25. To provide a gate pulse CS in framing time the 110 output must be utilized with 00 output. Channel C1 is used for the lower speed service class B, and, hence, output 00 and output 000 are gated in and "AND" gate 18 to define the gate pulse for channel time 1. To derive the class B channels, the beat method of deriving the class B channel gate pulses is utilized. The output of clock 1 is coupled to a five-stage flip-flop divider 19 and employs a reset gate 20. Divider 19 is exactly the same divider as divider 16 in structure, but is operated to allow the divider to count 24. The 1:4:25 and 1:6:25 channel time outputs are utilized to provide channel gate pulse. Since a combination of these 1:4:25 and 1:6:25 outputs produced 23 extraneous outputs, the 1:4:25 leads are gated in "AND" gates 21 with C1 channel gate pulse to produce the proper outputs which, when combined with 1:6:25 outputs in the "AND" gate matrix 22, provide gate pulse in the channel B times.

The gate pulse defining class B framing is obtained by gating the 00 and 000 output of divider 19 with the gate pulse defining class C framing in "AND" gate 22A. The other class B channels are derived by gating the output from the appropriate one of "AND" gates 21 with the appropriate output 1:6:25 and the gate pulse defining class C channel 1 time.

The generation of the class A gate pulses defining class A channels is obtained by coupling the gate pulse output of "AND" gate 22A, the class B framing pulse, to flip-flop divider 23, a 1:32 divider, which operates to divide the class B framing repetition rate by 32 which is the natural count of the five-stage flip-flop and, therefore, no output or reset gates are required to cooperate with divider 23. Since class B timing repetition rate is 2400 c.p.s., the 32:1 division resulting in divider 23 results in 75 pulses per second output for class A channel identification. In the generation of the channel A gate pulses, all outputs of the divider are utilized to define the 32 channels of class A service and are appropriately coupled to the matrix of "AND" gate 24 to define gate pulses for the channel times of class A operation. Class A framing pulse precedes channel A1 by only 0.7 microsecond. Since the outputs from the divider 23 are wide pulses, both framing pulse AS and the first channel gate pulse A1 are present in the 00000 output of divider 23. Thus, the framing pulse is obtained by gating the 00 output and 000 output with the framing pulse of B service in "AND" gate **24*a*. The "AND" gate 24*b* utilized to generate the A1 gate pulse has also coupled thereto B framing signal which is applied to an inhibit terminal 25 to inhibit the output of "AND" gate 24*b*** during the generation of the A framing signal.

Another output required from the pulse generator is a synchronizing signal, for instance, to enable the utilization of this generator in a communication system for synchronizing the operation of the receiver with a transmitter. Thus, to provide a recognizable synchronizing signal for all three classes of service, the master sync is obtained by gating the class C framing gate pulse with class A framing gate pulse in "AND" gate 26 and inhibiting the class C framing gate pulse by the class B framing gate pulse in inhibit gate 27. The outputs of gates 26 and 27 are coupled to an "OR" gate 28 to provide the desired master sync. With this arrangement the master synchronizing signal has a characteristic in which every 24th class C framing pulse is blanked except the one which occurs at the start of each A frame.

Figure 6:
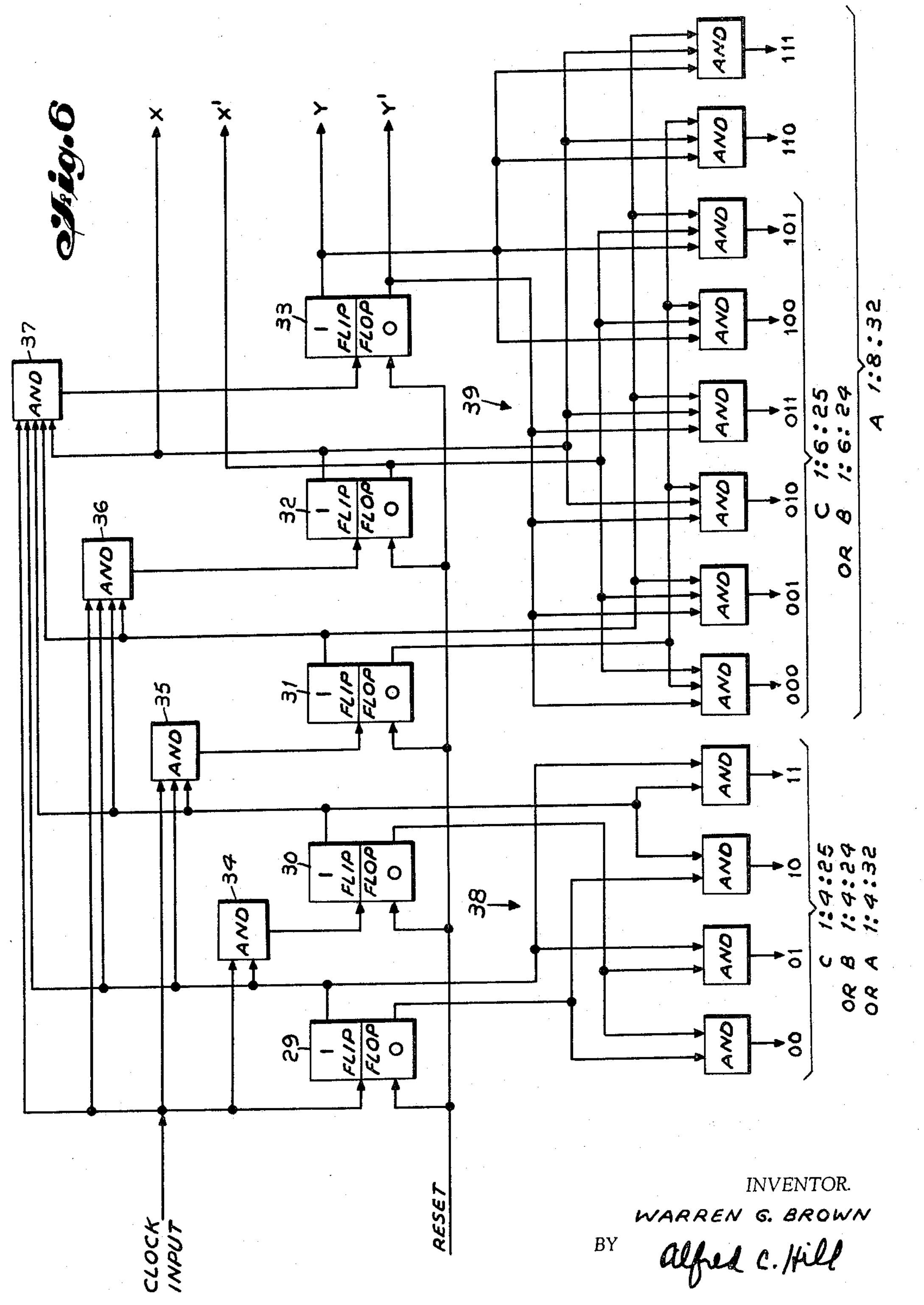
FIG. 6 is a schematic diagram in block form of the frequency divider employed in each of the divider stages of the generator of FIG. 5.

Referring to FIG. 6, there is illustrated therein a schematic diagram in block form of the five-stage flip-flop divider which is employed in each of the dividers 16, 19, and 23 in the generator of FIG. 5. The divider includes five flip-flops 29, 30, 31, 32, and 33. The clock pulses to be divided are coupled directly to the first flip-flop 29 for symmetrical triggering thereof, to the flip-flop 30 through "AND" gate 34, to flip-flop 31 through "AND" gate 35, to flip-flop 32 through "AND' gate 36, and to flip-flop 33 through "AND" gate 37. This arrangement of symmetrically triggering flip-flops 29–33 provides high speed and prevents the accumulation of delay caused by differentiation of the outputs of each flip-flop to trigger the next flip-flop. Thus, each flip-flop only has its own delay and provides much more accurate timing. "AND" gates 34, 35, 36, and 37 are coupled to the one output of the lower weight flip-flops which in combination with the clock pulses provide the trigger for each flip-flop to which its output is connected. In the normal counting sequence a flip-flop triggers on the count after all previous flip-flops are in the one state and the "AND" gates require that all previous flip-flops be in the one state to enable the clock pulse to pass to its associated flip-flop for triggering thereof.

The 00, 01, 10 and 11 output, or, in other words, the 1:4:$x$ output of the divider, where $x$ is 24, 25 or 32, is provided by the counts of the two lowest rate flip-flops, namely, flip-flops 29 and 30, as provided by "AND" gate matrix 38. The 1:6:$x$, where $x$ is equal to 24 and 25 or 1:8:32 outputs, are obtained from the three highest weight flip-flops, namely, flip-flops 31, 32 and 33 as provided by "AND" gate matrix 39. Each of these outputs determines the three highest digits of the desired count. When one of each matrix 38 and 39 is "AND" gated, a unique number is defined and utilized to uniquely define the time positions of the channels of the service in which this divider is employed. This divider has two major advantages. The number of diodes in the matrices 38 and 39 is reduced and fewer output leads are required to define the channel times (10 instead of 24 for class C and B operation and 12 instead of 32 for class A operation).

The "AND" gates of matrix 39 providing the 110 and 111 outputs are only used to derive channel times in class A operation where the count is 32. Further, the output from the "AND" gate of matrix 39 providing 110 is used in class C service to derive the time for the class C framing pulse which is located in channel 25 time corresponding to a count 11000.

Employing common circuitry, as illustrated in FIG. 6 for the three dividers 16, 19, and 23 of FIG. 5, enables the reduction in the number of spare parts that are required in the field to service such equipment since this circuit can be employed in either of the dividers 16, 19, and 23 with appropriate connections for the input gates and reset gates as well as outputs X, X′, Y and Y′ to these input gates and reset gates.

Referring to FIGS. 5 and 6 in conjunction with the curves of FIGS. 7, 8, 9, and 10, a more detailed description of the operation of the generator of FIG. 5 will be described.

Figure 7:
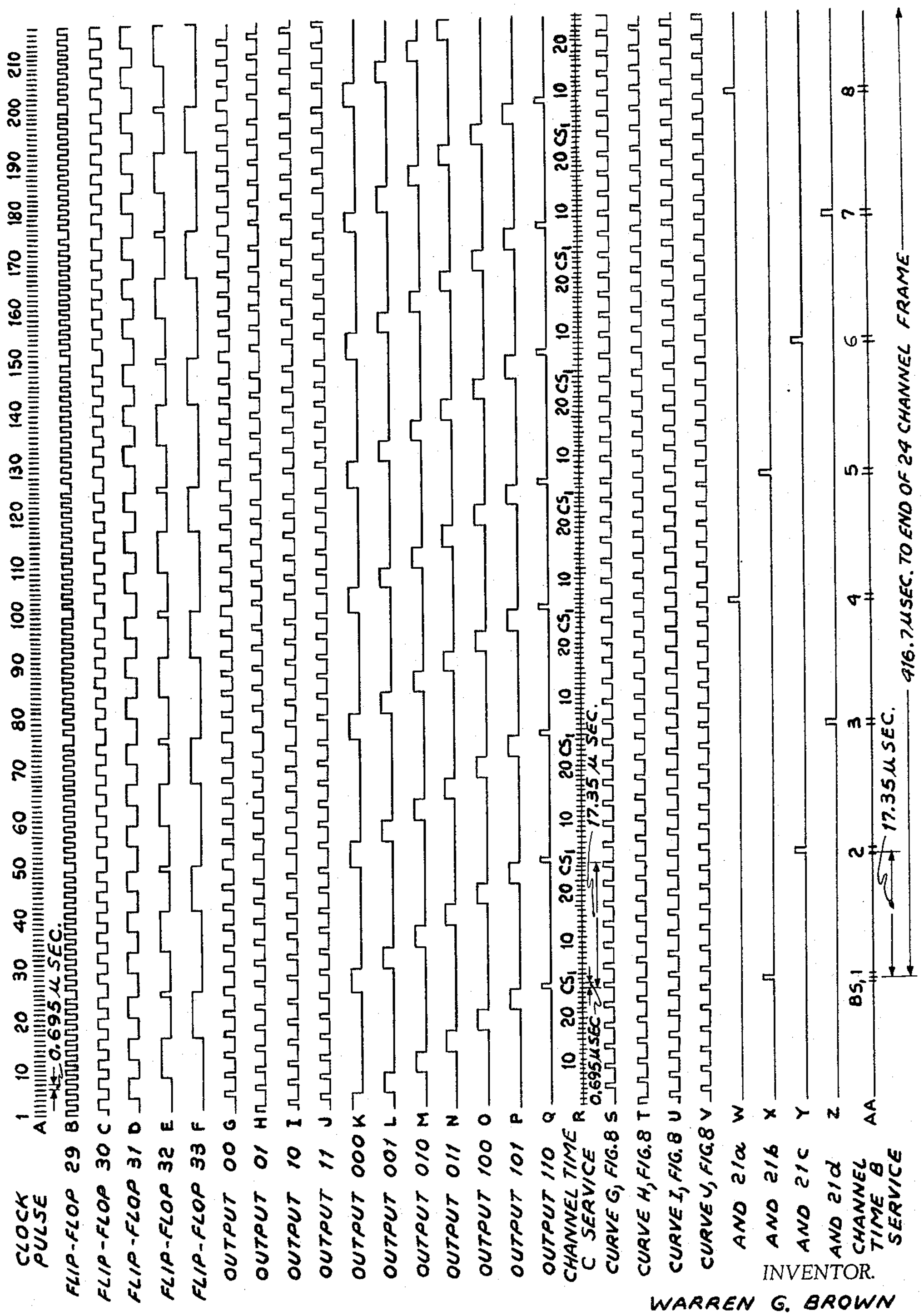
FIG. 7 is a timing diagram useful in explaining the operation of the divider to provide class C service in the pulse generator of FIG. 5.

Curve A, FIG. 7, illustrates the output of clock 1 which is coupled to divider 16 througt "AND" gates 12 and 13 and "OR" gate 14. "AND" gates 12 and 13 are enabled by X′ and Y′. Outputs X′ and Y′ from divider 16 are connected to the "0" output of flip-flops 32 and 33 (FIG. 6), respectively, and in the condition prior to count and up to triggering of these flip-flops is high, and thus, the clock pulses from source 1 will be passed through the "OR" gate 14 to trigger divider 16. The couning operation of flip-flops 29, 30, 31, and 32 and 33 are illustrated in Curves B, C, D, E, and F of FIG. 7, respectively. It should be noted that the curves B through F of FIG. 7 are representative of the "1" output of the flip-flops and the the "0" output of these flip-flops would be the reverse. When the 24th clock pulse has been counted, the "0" output of flip-flop 32 is low as in the "0" output of flip-flop 33 and, thus, the outputs X′, Y′ are low and will not enable "AND" gates 12 and 13 and, hence, will not permit the passage of clock pulses to divider 16. Thus, with this condition, the 25th pulse cannot enter divider 16 and will not be counted. Since the flip-flops 32 and 33 both have high outputs on output "1", the X and Y outputs enable reset gate 15, and the 25th clock pulse is passed to reset divider 16. Thus, divider 16 counts 24 pulses and does not count the 25th pulse. Curves G through Q of FIG. 7 illustrates the conditions at the output of the "AND" gates of matrices 38 and 39 of divider 16, with these outputs being appropriately connected to "AND" gate matrix 18 and "AND" gate 17 as described hereinabove with respect to FIG. 5, the gate pulses for the channel times of the class C operation are defined as indicated in curve R, FIG. 7 and provide the desired channel gate pulses.

Figure 8:
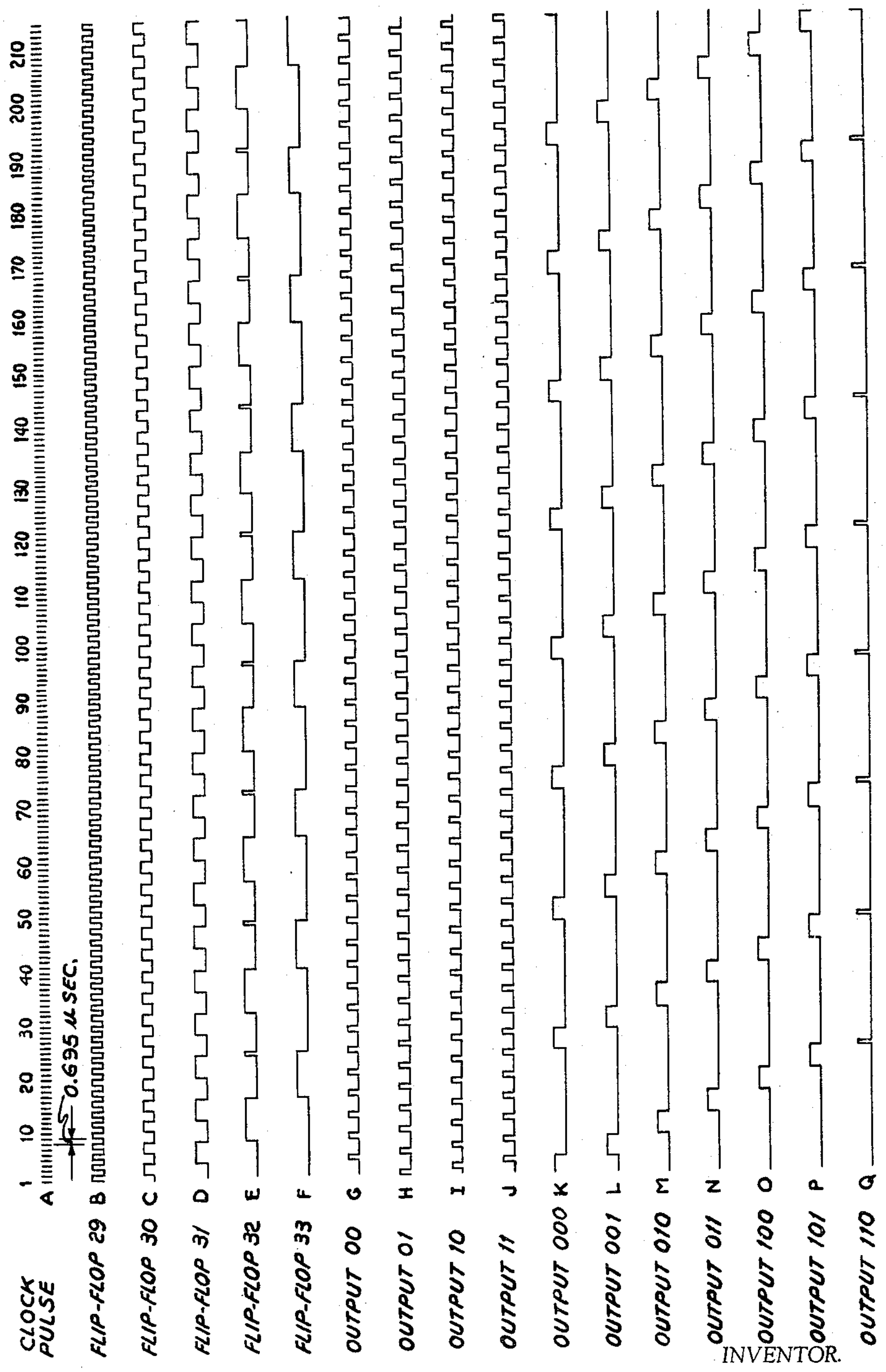
FIG. 8 is a timing diagram useful in explaining the generation of the channel gate pulses in the divider providing class B service in the generator of FIG. 5.

Turning now to FIG. 8, the operation of divider 19 will be described for the production of gate pulses defining the channel times for class B series.

The clock pulses of clock 1 are illustrated in curve A, FIG. 8. Divider 19 will count normally up to the 24th clock pulse. When the 24th clock pulse enters divider 19, flip-flop 32 will be triggered to have a high output on output "1" and flip-flop 33 will already have a high output on the "1" output. Thus, the X and Y outputs from divider 19 which are coupled to the "1" outputs of flip-flops 32 and 33, respectively, are coupled to "AND" gate 20 to enable this gate and pass the 24th pulse therethrough to reset the divider 19 upon the occurrence of the 25 pulse. Curves G through Q, FIG. 8, illustrates the outputs present in the matrics 38 and 39 (FIG. 6).

Turning again to FIG. 7, curves S, T, U, and V thereof are duplicates of curves G, H, I, and J, FIG. 8. These outputs are coupled to "AND" gate matrix 21 with the output represented by curve S coupled to "AND" gate 21*a*, the output represented by curve T coupled to "AND" gate 21*b*, the output represented by curve U coupled to "AND" gate 21*c*, and the output represented by curve V coupled to "AND" gate 21*d*. These "AND" gates 21 are enabled by the channel gate identifying the channel time for channel 1 of the class C service. Thus, when the gate pulse representing channel 1 of the class C operation enables the "AND" gate 21, one of the "AND" gates will be output represented by curves S coupled to "AND" gate 21*a*, the output represented by curve U coupled to "AND" gate 21*c*, and the output represented by curve V coupled to "AND" gate 21*d*. These "AND" gates 21 are enabled by the channel gate identifying the channel time for channel 1 of the class C service. Thus, when the gate pulse representing channel 1 of the class C operation enables the "AND" gate 21, one of the "AND" gates will be opened and will permit the gate pulse to pass. For instance, when the channel gate for the first channel of class C service (curve R, FIG. 7) is beaten with curve T, "AND" gate 21*b* will open and pass a pulse as represented in curve X, FIG. 7. This beating process will occur in the other "AND" gates producing the curves W, X, Y and Z. When the pulses of these waveforms W, X, Y, and Z are coupled to the matrics 22 and beaten against the first channel of class C service (curve R, FIG. 7), the channel times for B service are identified as indicated in curve AA.

As indicated hereinabove, the time for the framing signal for class B service is derived from the 00 and 000 outputs of divider 19 directly when gated against the framing signal for class C operation. Thus, in gate 22*a* the output of curve S, FIG. 7, and the output of curve K, FIG. 8, are gated by the synchronizing signal CS of curve R, FIG. 7, to produce the framing signal BS indicated in curve AA, FIG. 7.

Figures 9, 10:
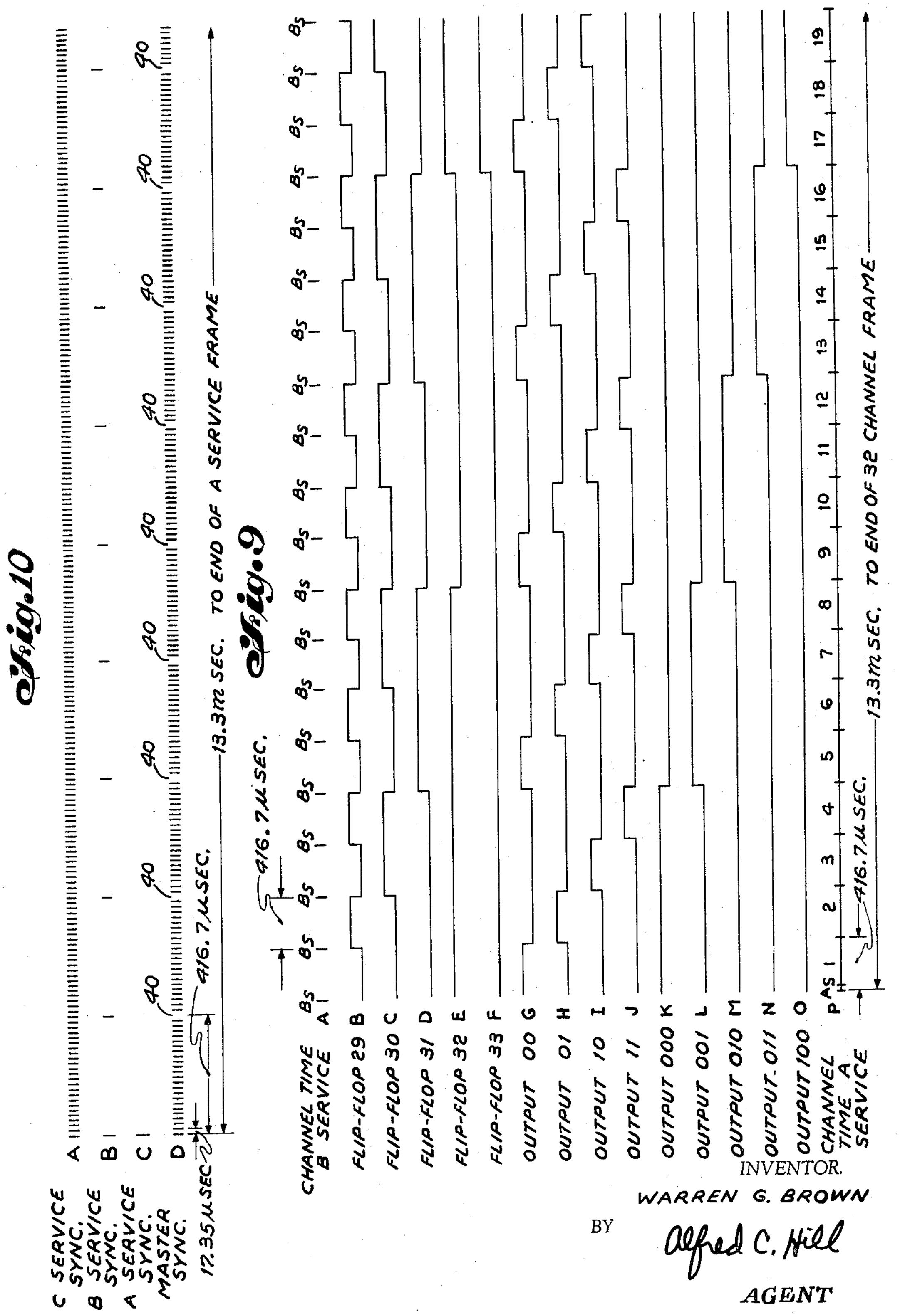
FIG. 9 is a timing diagram useful in explaining the operation of the divider of FIG. 5 providing the gate channel pulses for class A service.
FIG. 10 is a timing diagram useful in explaining the generation of the master sync waveform in the generator of FIG. 5.

Referring to FIG. 9, the operation of divider 23 in FIG. 5 in connection with the details in FIG. 6 will now be described. It should be noted that the scale of FIG. 9 is different than that of FIGS. 7 and 8 to enable the illustration of several frames of class B service. Curve A, FIG. 9 represents the framing signal BS in a number of frames of class B service. Curves B through F, FIG. 9, illustrate the normal count for the divider of FIG. 6 when triggered by the framing signal of class B service obtained from the output of "AND" gate 22*a*. Curves G through O represent the outputs available for matrix 38 and a portion of matrix 39 up to and including the 100 output of matrix 39 which is sufficient to show the derivation of the channel times for class A service as illustrated in curve P, FIG. 9. The channel times for class A service are derived from the appropriate combination of the outputs of matrices 38 and 39 in the "AND" gates 24. For instance, channel 1 of the class A service is derived in gate 24*b* by utilizing the 00 output of matrix 38 and the 000 output of matrix 39. Channel 2 would be derived by utilizing the 01 output of matrix 38 and the 000 output of matrix 39. The fifth channel time is defined by the 001 output of matrix 39 and the 00 output of matrix 38. As indicated hereinabove, the framing gate pulse for class A service is derived from 00 output of matrix 38 and the 000 output of matrix 39 when gated with the framing gate pulse of class B service. Thus, "AND" gate 24*a* has coupled thereto the 00 output of matrix 38 and the 000 output from matrix 39 as well as the output of "AND" gate 22*a* which provides the frame pulse AS, as indicated in curve P, FIG. 9. To assure that there is no interference between this sync pulse and channel 1 time, the B synchronizing signal is coupled to inhibit terminal 25 of "AND" gate 24*b*.

Turning now to the production of the master synchronizing signal for the generator of this invention. Attention is directed to FIG. 10. and FIG. 5. In FIG. 10, curve A, there is illustrated the framing signal for class C service, curve B illustrates the framing signals for class B service, curve C represents the framing signals for class A service, curve D represents the output from "OR" gate 28, FIG. 5, namely, the master sync. It will be observed that when class A, B and C frame pulses are present simultaneously, there will be a synchronizing pulse as indicated by the first pulse in curve D. However, when class A framing pulses are absent the class B framing pulses inhibit the class C framing pulses, thereby leaving a blank in the master synchronizing pulses as indicated at 40 in curve D, FIG. 10.

While I have described above the principles of my invention in connection with specific apparatus, it is to be clearly understood that this description is made only by way of example and not as a limitation to the scope of my invention as set forth in the objects thereof and in the accompanying claims.

I claim:

1. A generator to provide within a predetermined period a plurality of groups of pulse trains, each of said groups of pulse trains having a different repetition rate comprising:

a source of pulses having a given repetition rate;

first means coupled to said source to produce as a first plurality of outputs for said generator a first group of time spaced pulse trains, each pulse train of said first group having a first repetition rate equal to a first integral fraction of said given repetition rate;

second means coupled to one of said source and said first means to produce pulses having a second repetition rate equal to a second integral fraction of said given repetition rate different than said first integral fraction; and third means coupled to said first means and said second means to produce as a second plurality of outputs for said generator at least a second group of time spaced pulse trains, each pulse train of said second group having a third repetition rate equal to a third integral fraction of said given repetition rate different than said second integral fraction.

2. A generator according to claim 1, wherein said second means is coupled to said source.

3. A generator according to claim 1, wherein said second means is coupled to said first means responsive to one pulse train of said first group of pulse trains.

4. A generator to provide within a predetermined period a plurality of groups of pulse trains, each of said groups of pulse trains having a different repetition rate comprising:

a source of pulses having a given repetition rate;

first means coupled to said source to produce a first group of pulse trains having a first repetition rate equal to a first integral of said given repetition rate;

second means coupled to one of said source and said first means to produce pulses having a second repetition rate equal to a second integral fraction of said given repetition rate different than said first integral fraction; and third means coupled to said first means and said second means to produce at least a second group of pulse trains having a third repetition rate equal to a third integral fraction of said given repetition rate different than said second integral fraction;

said first means including a first divider coupled to said source to provide pulses having said first repetition rate, and a first pulse distributor coupled to said divider to provide said first group of pulse trains;

said second means including a second divider coupled to said source to provide pulses having said second repetition rate; and said third means including a coincidence circuit coupled to said second divider and said first distributor responsive to said pulses having said second repetition rate and one of the pulse trains of said first group of pulse trains to produce said third repetition rate, and a second pulse distributor coupled to said coincidence circuit to produce said second group of pulse trains.

5. A generator to provide within a predetermined period a plurality of groups of pulse trains, each of said groups of pulse trains having a different repetition rate comprising:

a source of pulses having a given repetition rate;

first means coupled to said source to produce a first group of pulse trains having a first repetition rate equal to a first integral fraction of said given repetition rate;

second means coupled to one of said source and said first means to produce pulses having a second repetition rate equal to a second integral fraction of said given repetition rate different than said first integral fraction; and third means coupled to said first means and said second means to produce at least a second group of pulse trains having a third repetition rate equal to a third integral fraction of said given repetition rate different than said second integral fraction;

said first means including a first divider coupled to said source, and a first pulse distributor coupled to said first divider to provide said first group of pulse trains;

said second means including a second divider coupled to said first distributor responsive to one pulse train of said first group of pulse trains to provide pulses having said second repetition rate; and said third means including a coincidence circuit coupled to said second divider and said first distributor responsive to said pulses having said second repetition rate and one pulse train of said first group of pulse trains to produce said third repetition rate, and a second pulse distributor coupled to said coincidence circuit to produce said second group of pulse trains.

6. A generator according to claim 5, wherein said second divider and said coincidence circuit are responsive to the same pulse train of said first group of pulse trains.

7. A generator according to claim 5, wherein said second divider is responsive to a given pulse train of said first group of pulse trains, and said coincidence circuit is responsive to a selected pulse train different than said given pulse train of said first group of pulse trains.

8. A generator according to claim 1, wherein said third means includes fourth means responsive to at least one pulse train of said first group of pulse trains to produce said second group of pulse trains, and fifth means coupled to said fourth means responsive to at least one pulse train of said second group of pulse trains to provide as a third plurality of outputs for said generator at least a third group of time spaced pulse trains, each pulse train of said third group having a fourth repetition rate equal to a fourth integral fraction of said given repetition rate different than said third integral.

9. A generator to provide within a predetermined period a plurality of groups of pulse trains, each of said groups of pulse trains having a different repetition rate comprising:

a source of pulses having a given repetition rate;

first means coupled to said source to produce a first group of pulse trains having a first repetition rate equal to a first integral fraction of said given repetition rate;

second means coupled to one of said source and said first means to produce pulses having a second repetition rate equal to a second integral fraction of said given repetition rate different than said first integral fraction; and third means coupled to said first means and said second means to produce at least a second group of pulse trains having a third repetition rate equal to a third integral fraction of said given repetition rate different than said second integral fraction;

said third means including fourth means responsive to at least one pulse train of said first group of pulse trains to produce said second group of pulse trains, and fifth means coupled to said fourth means responsive to at least one pulse train of said second group of pulse trains to provide at least a third group of pulse trains having a fourth repetition rate equal to a fourth integral fraction of said given repetition rate different than said third integral;

said fifth means includes a divider coupled to said fourth means responsive to a given pulse train of said second group of pulse trains, and a distributor coupled to said divider to provide said third group of pulse trains.

10. A generator to provide within a predetermined period a plurality of groups of pulse trains, each of said groups of pulse trains having a different repetition rate comprising:

a source of pulses having a given repetition rate;

first means coupled to said source to produce a first group of pulse trains having a first repetition rate equal to a first integral fraction of said given repetition rate;

second means coupled to one of said source and said first means to produce pulses having a second repetition rate equal to a second integral fraction of said given repetition rate different than said first integral fraction;

third means coupled to said first means and said second means to produce at least a second group of pulse trains having a third repetition rate equal to a third integral fraction of said given repetition rate different than said second integral fraction;

said third means including fourth means responsive to at least one pulse train of said first group of pulse trains to produce said second group of pulse trains, and fifth means coupled to said fourth means responsive to at least one pulse train of said second group of pulse trains to provide at least a third group of pulse trains having a fourth repetition rate equal to a fourth integral fraction of said given repetition rate different than said third integral; and sixth means coupled to said first means, said third means and said fifth means responsive to a given pulse train of said first group of pulse trains, a given pulse train of said second group of pulse trains and a given pulse train of said third group of pulse trains to provide a master synchronization signal for the three groups of pulse trains.

11. A generator according to claim 10, wherein said sixth means includes an inhibit gate having one input coupled to said first means responsive to said given pulse train of said first group of pulse trains and the inhibit terminal coupled to said third means responsive to said given pulse train of said second group of pulse trains, a coincidence circuit having one input coupled to said first means responsive to said given pulse train of said first group of pulse trains and the other input coupled to said fifth means responsive to a given pulse train of said third group of pulse trains, and an output circuit coupled in common to the output of said inhibit gate and said coincidence circuit to provide said master synchronization signal.

12. A generator according to claim 11, wherein each of said groups of pulse trains includes a framing pulse train; and said given pulse train of each group of pulse trains is said framing pulse trains.

13. A generator to provide within a predetermined period a plurality of groups of pulse trains, each of said groups of pulse trains having a different repetition rate comprising:

a source of pulses having a given repetition rate;

first means coupled to said source to produce a first group of pulse trains having a first repetition rate equal to a first integral fraction of said given repetition rate;

second means coupled to one of said source and said first means to produce pulses having a second repetition rate equal to a second integral fraction of said given repetition rate different than said first integral fraction;

third means coupled to said first means and said second means to produce at least a second group of pulse trains having a third repetition rate equal to a third integral fraction of said given repetition rate different than said second integral fraction; and means coupled to said first and third means responsive to one pulse train of each group of pulse trains produced to generate a master synchronization signal for the groups of pulse trains.

14. A generator according to claim 1, wherein said first repetition rate and said third repetition rate have no common factor.

15. A generator to provide within a predetermined period a plurality of groups of pulse trains, each of said groups of pulse trains having a different repetition rate comprising:

a source of pulses having a given repetition rate;

a first binary divider coupled to said source having a first division factor;

a first plurality of coincidence circuits coupled to said first divider to generate a first group of pulse trains having a first repetition rate equal to said given repetition rate divided by said first division factor;

a second binary divider coupled to said source having a second division factor different than said first division factor, a first plurality of outputs and a second plurality of outputs;

a second plurality of coincidence circuits coupled to said first plurality of outputs of said second divider and a predetermined one of said first plurality of coincidence circuits; and a third plurality of coincidence circuits coupled to a predetermined one of said first plurality of outputs of said second divider, said second plurality of outputs of said second divider, said second plurality of coincidence circuits, and one of said first plurality of coincidence circuits to generate a second group of pulse trains having a seond repetition rate equal to said first repetition rate divided by said second division factor.

16. A generator according to claim 15, wherein said first division factor and said second division factor have no common denominator.

17. A generator according to claim 15, wherein each of said first and second dividers includes five flip-flop circuits;

said first divider includes an input gate circuit coupled to said source and the outputs of predetermined ones of said flip-flop circuits, and a first reset circuit coupled to said source and selected one of the outputs of said predetermined ones of said flip-flop circuits, said input gate circuits and said first reset circuit cooperating to provide said first division factor; and said second divider includes a second reset circuit coupled to said source and the output of predetermined ones of said flip-flop circuits to provide said second division factor.

18. A generator according to claim 17, wherein each of said first and second dividers further includes a coincidence circuit coupled to the input of each of the last four of said flip-flop circuits to trigger the associated one of said flip-flop circuits upon coincidence between the pulses from said source and an output signal from the "1" output of all preceding ones of said flip-flops.

19. A generator according to claim 15, wherein said generator further includes a third binary divider coupled to the output of a predetermined one of said third plurality of coincidence circuits having a third division factor different than said first and second division factors; and a fourth plurality of coincidence circuits coupled to said third divider and said predetermined one of said third plurality of coincidence circuits to generate a third group of pulse trains having a third repetition rate equal to said second repetition rate divided by said third division factor.

20. A generator according to claim 19, wherein each of said first, second and third dividers includes five flip-flop circuits;

said first divider includes an input gate circuit coupled to said source and the outputs of predetermined ones of said flip-flop circuits, and a first reset circuit coupled to said source and selected one of the outputs of said predetermined ones of said flip-flop circuits, said input gate circuits and said first reset circuit cooperating to provide said first division factor; and said second divider includes a second reset circuit coupled to said source and the output of predetermined ones of said flip-flop circuits to provide said second division factor.

References Cited by the Examiner

UNITED STATES PATENTS

| | | | |
|---|---|---|---|
| 2,566,085 | 8/1951 | Green | 331—51 |
| 3,147,442 | 9/1964 | Fritzche et al. | 331—51 X |
| 3,212,010 | 10/1965 | Podlesny | 328—63 X |

ARTHUR GAUSS, *Primary Examiner.*

J. HEYMAN, *Assistant Examiner.*